J. E. WALTON.
Thill-Coupling.
No. 198,325.  Patented Dec. 18, 1877.
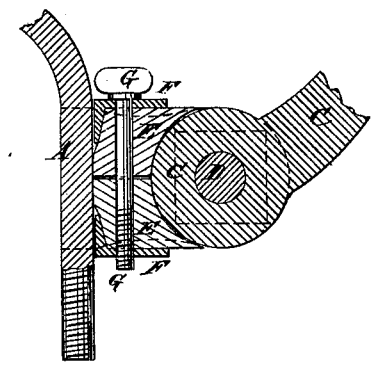
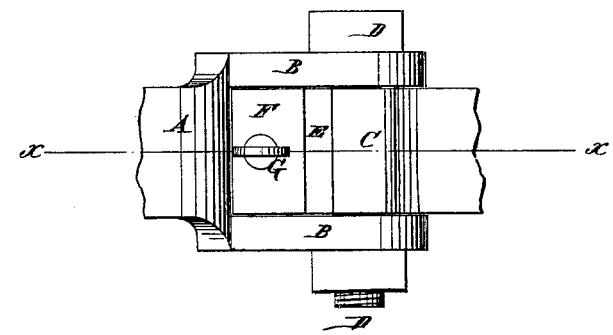
WITNESSES:
H. Rydquist
J. H. Scarborough
INVENTOR:
J. E. Walton
BY Munn & Co.
ATTORNEYS.

UNITED STATES PATENT OFFICE.

JEREMIAH E. WALTON, OF WILTON, CONNECTICUT.

IMPROVEMENT IN THILL-COUPLINGS.

Specification forming part of Letters Patent No. 198,325, dated December 18, 1877; application filed October 26, 1877.

*To all whom it may concern:*

Be it known that I, JEREMIAH EVARTS WALTON, of Wilton, in the county of Fairfield and State of Connecticut, have invented a new and useful Improvement in Thill-Coupling, of which the following is a specification:

Figure 1 is a detail vertical section of my improved coupling, taken through the line $x$ $x$, Fig. 2. Fig. 2 is a top view of the same.

Similar letters of reference indicate corresponding parts.

The object of this invention is to furnish an improved thill-coupling, which shall be noiseless in use, may be packed after the thills are secured in place, and which shall be simple in construction and convenient in use.

The invention will first be described in connection with the drawing, and then pointed out in the claim.

A represents the bow of an axle-clip, upon the side edges of the forward arm of which are formed two lugs, B, at such a distance apart as to receive the eye of the thill-iron C between them, where it is secured in place by a bolt, D. E is a rubber block or packing, which may be made in one or in two pieces, and is interposed between the eye of the thill-iron C and the arm of the bow A, with its sides resting against the lugs B.

Upon the upper and lower sides of the rubber packing E are placed two metal plates, F, which are secured to each other by a screw, G, which passes through one of said plates and the rubber packing E, and screws into a screw-hole in the other plate, so that by turning the said screw the rubber will be compressed and made to press firmly against the eye of the thill-iron C. The plates F may have wedge-shaped flanges formed upon their rear edges, which, when the plates F are drawn toward each other by the screw G, are forced in between the packing F and the bow A, and press the rubber E forward more firmly as it is compressed.

If desired, the plates F may be made in the form of solid blocks, and forced forward to bear upon the eye of the thill-iron by the screw G, in which case the rubber blocks need not be used. The thill-iron may be made in the form of a hook or open clutch, and the bolt D may be riveted to the lugs B.

Instead of both plates F being movable, one may be stationary, and the rubber compressed by drawing the other toward it.

I am aware that it is not new to use a solid piece of rubber in rear of thill-iron eye, and make it compressible by a screw and nut to take up wear; but, by making my rubber in two equal or nearly equal parts, divided horizontally, as shown in Fig. 1 of the drawing, there is no necessity for removing the thills in order to replace a worn rubber, while, by the use of a thumb-screw and angle-plates, I dispense with a nick in head, or a nut, rendering a screw-driver or wrench unnecessary.

What I claim as new in thill-couplings is—

The combination, with axle-clip, having lugs B and a thill-iron, C, secured in place by a bolt, D, of a two-part rubber-block, E, plates F, and screw G, substantially as and for the purpose specified.

JEREMIAH EVARTS WALTON.

Witnesses:
 ANNIE E. CHICHESTER,
 HENRY E. CHICHESTER.